Figure 1:
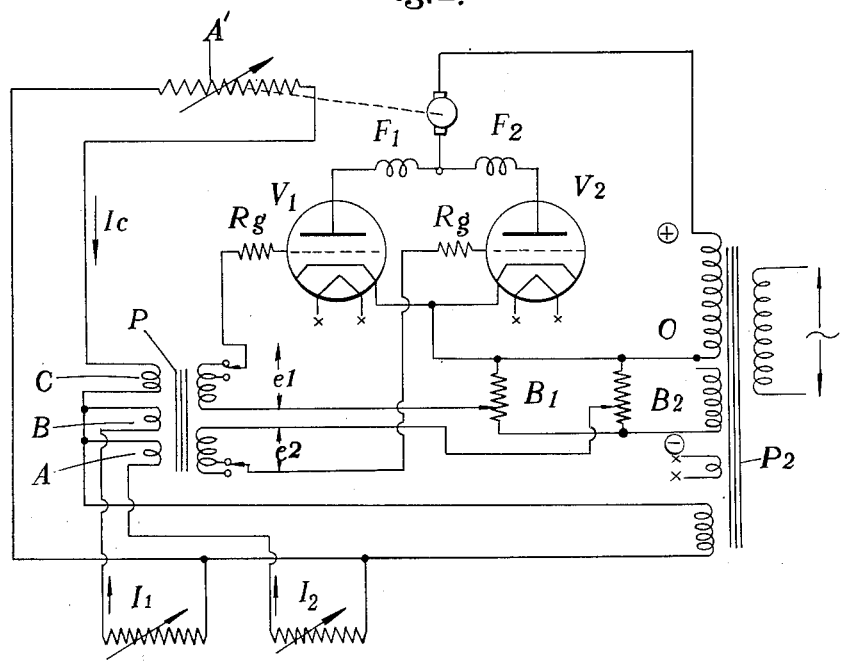

July 4, 1939.   R. J. WEY   2,164,728
ELECTRIC SIGNALING OR CONTROLLING SYSTEM EMPLOYING FOLLOW-UP DEVICES
Filed Feb. 6, 1936    4 Sheets-Sheet 1

INVENTOR
RAYMOND JOHN WEY
BY
McConkey & Booth
ATTORNEYS

July 4, 1939.                 R. J. WEY                  2,164,728
        ELECTRIC SIGNALING OR CONTROLLING SYSTEM EMPLOYING FOLLOW-UP DEVICES
                    Filed Feb. 6, 1936         4 Sheets-Sheet 2
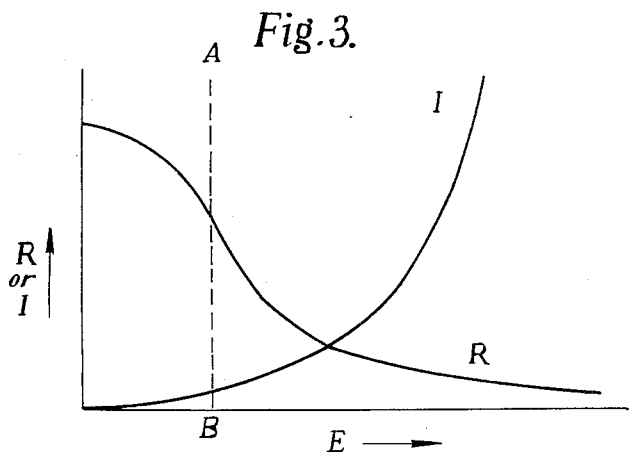
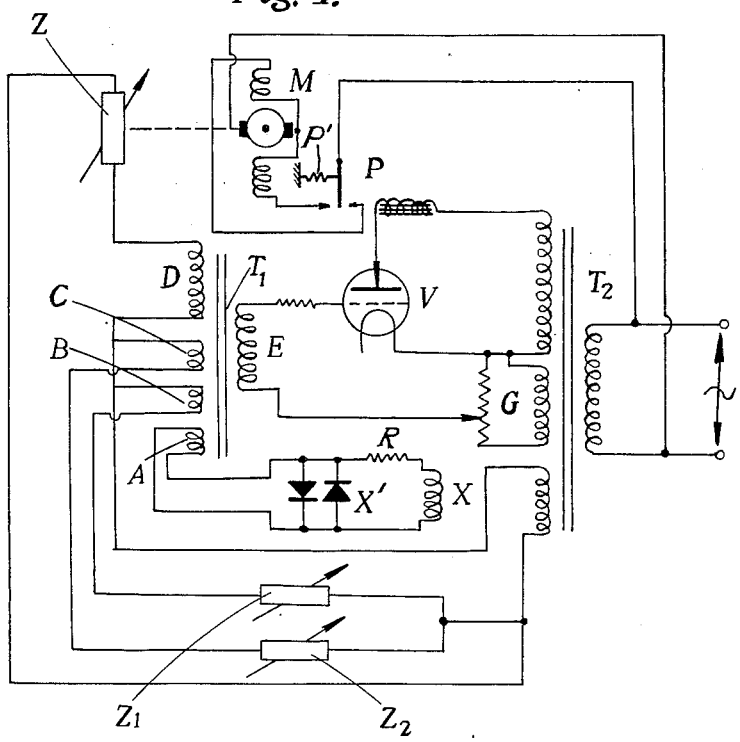
INVENTOR.
RAYMOND JOHN WEY
BY
McConkey & Booth
ATTORNEYS.

Patented July 4, 1939

2,164,728

UNITED STATES PATENT OFFICE 2,164,728

ELECTRIC SIGNALING OR CONTROLLING SYSTEM EMPLOYING FOLLOW-UP DEVICES

Raymond John Wey, London, England, assignor to Republic Flow Meters Company, Chicago, Ill., a corporation of Illinois Application February 6, 1936, Serial No. 62,571
In Great Britain February 16, 1935

6 Claims. (Cl. 172—239)

This invention relates to electric signaling or controlling systems, for example, remote control systems, and has particular reference to systems employing follow-up devices as, for example, in which a follow-up device is used for the purpose of obtaining sufficient working forces for the operation of one or more indicating, recording or integrating meters or of one or more repeating, compensating or control units.

As is well known, the torque available from an element which is displaceable with variations in a quantity or characteristic required to be measured, indicated, integrated, repeated, corrected, compensated for, controlled or used for controlling purpose, is often of insufficient magnitude to serve for the direct operation of the mechanism needed for indicating, controlling or other purposes and the chief object of the present invention is to provide a simple and convenient form of electrically controlled follow-up or relay device for controlling the actuation of an associated relatively high-torque mechanism or device in such a manner that a high standard of accuracy is ensured.

The actuating means for the relatively high-torque mechanism or device usually comprises one or more electric motors or other electro-mechanical units and it has been found that the control thereof is best achieved by the use of one or more thermionic valves or gas-filled relays arranged in circuits associated with the motor or motors or other units so that the valves or relays control the currents flowing in the windings of the motor or the like.

According to one feature of the invention, therefore, a measuring element or instrument or a repeating, controlling or like device is equipped with an electrically controlled follow-up or relay device comprising one or more thermionic valves or gas filled relays arranged so that the output therefrom is utilised for the actuation or control of a reversible motor or other electro-mechanical device, the arrangement being such that there is applied to the grid element or elements of the thermionic valves or relays a voltage the magnitude of which is dependent upon the currents passing in two circuits.

Thus, the invention consists in a remote control or follow-up device incorporating means for producing a voltage varying with the position or condition of a primary element, means for producing a second voltage varying with the position or condition of a secondary element, the said voltages being compounded and the resultant applied to the control element or elements of one or more thermionic valves or gas-filled relays, and means for varying the position or condition of the secondary element in such a manner that the tendency of the secondary element is to assume a condition or position of equilibrium determined by the position or condition of the primary element.

It will be appreciated that the primary element may form part of a measuring instrument or it may be constituted by an element the condition or position of which is caused to vary with a physical, electrical or other characteristic such as, for example, velocity, fluid flow, temperature or pressure.

Figures 1, 2, 4, 5, 6 and 7 are diagrams illustrating several modified circuits embodying the invention; and Figure 3 is a chart indicating the characteristics of one of the elements of Figure 4.

Figure 2:
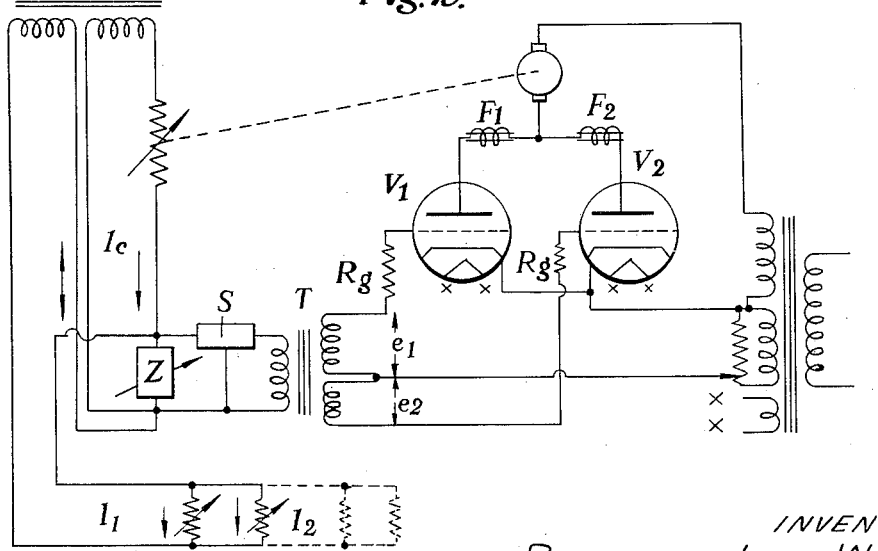

Two typical circuit arrangements using two tubes $V_1$ and $V_2$ are shown diagrammatically and by way of example in Figs. 1 and 2 of the accompanying drawings. In the Fig. 1 arrangement, a balancing transformer P is used provided with primary windings A and B carrying the primary currents $I_1$ and $I_2$, a secondary winding C carrying the controlled or secondary current $I_c$ and a pair of tapped grid windings for furnishing the grid voltages $e_1$ and $e_2$. The connections with the grids may include grid current stopping resistances $R_g$ and the anodes of the valves are connected with the field coils $F_1$ and $F_2$ of a reversible electric motor having its armature connected with an actuated unit A' in the controlled circuit. The anode current is supplied from a source of alternating current through a tapped transformer $P_2$ and a pair of potentiometers $B_1$ and $B_2$ are provided for adjustment of the grid bias of the valves. The Fig. 2 arrangement is similar in certain respects but, in this instance, the additional grid voltage is derived from a circuit including a balancing impedance Z and an amplifying transformer T. If desired, the circuit may also include a phase shifting network as indicated at S.

In some instances a non-linear impedance may be used in conjunction with the balancing impedance or transformer. The characteristics of a common form of non-linear impedance are shown in Fig. 3 of the drawings accompanying this specification, which figure illustrates the general shape of the voltage-current and voltage-resistance characteristics of a rectifier either of the "metal", e. g. cuprous oxide, type or of the thermionic type. It will be seen that the resistance, shown in curve R, falls rapidly to a very low figure when the applied voltage exceeds a certain limit AB, the current, of course, rising rapidly. The effect of such a non-linear device when connected across the balancing impedance or to a winding of the balancing transformer, as shown at X in Fig. 4 of the drawings, is two-fold. In the first place, it reduces the mutual coupling effect of the balancing impedance or transformer upon the primary and secondary circuits in the event of these being largely unbalanced, such as would occur if the primary current were varied too rapidly for the driving-motor to actuate the follow-up device in unison. In this case, a relatively large voltage would tend to be set up across the balancing impedance or transformer, and this voltage, acting in series with the supply voltage to the primary and secondary circuits, would tend to increase the current in the former and decrease the current in the latter, or vice versa, according to the polarity. The presence of a non-linear resistance device such as that described would prevent this voltage across the balancing impedance or transformer from exceeding a certain limit determined by the circuit constants, and thus the mutual coupling of the primary and secondary circuits can be maintained at a low value. The second effect is a direct result of the first, since the limitation of the voltage across the balancing impedance or transformer also sets a limit to the magnetic flux which can occur in the core of the transformer (or reactance, when such is used), and, as is well known, flux and voltage in a transformer are directly proportional to each other. It is known that magnetic materials and particularly alloys used in the construction of transformers, are affected by excessive magnetisation, which may considerably reduce the permeability, the effect remaining even after removal of the excessive magnetomotive force. Such a reduction of permeability, by reducing the inductance of the transformer (or reactance coil) would be detrimental to the accuracy of the follow-up or control device as a whole, but the use of a non-linear resistance, as described, obviates this occurrence.

The circuit shown in Fig. 4, in addition to illustrating the use of a non-linear resistance for the purposes set forth above, illustrates also the use of a combination of resistance and reactance for the purpose of adjustment of the sensitivity of the device. The resistance R and the reactance X may both be adjustable if desired and have a pair of oppositely connected rectifiers X' in shunt therewith, and although they are shown connected in series across the winding A of the balancing transformer $T_1$, the other arrangements may obviously be used, such as parallel connection, or connection across any of the other windings B, C, D or E.

The transformer $T_1$ is adapted for the compounding of the currents passing through the impedances $Z_1$ and $Z_2$ by means of the windings B and C. The secondary current passes through the winding D and is controlled by means of the variable impedance Z, the control of which is effected through the action of the electric motor M. A single thermionic valve or gas-filled relay is shown by way of example, and in the anode circuit of this is included the relay P, the contacts of which control the current to the motor M. The relay is so biased by a spring P' that with the normal current passing through the winding both contacts are open, but when this current varies from the normal by more than a predetermined amount, either the one or the other of the contacts closes, and the motor M is caused to rotate in one direction or the other, as determined by the increase or decrease in anode current of the thermionic valve or gas-filled relay V. The grid bias of the latter is supplied by the winding G of the power supply transformer $T_2$, through the winding E of the balancing transformer $T_1$ and is adjusted to such a value that the anode current of V is of the normal value when the impedance Z is correctly adjusted with respect to the impedances $Z_1$ and $Z_2$, which may form part of a measuring or regulating system or the like.

Figure 5:
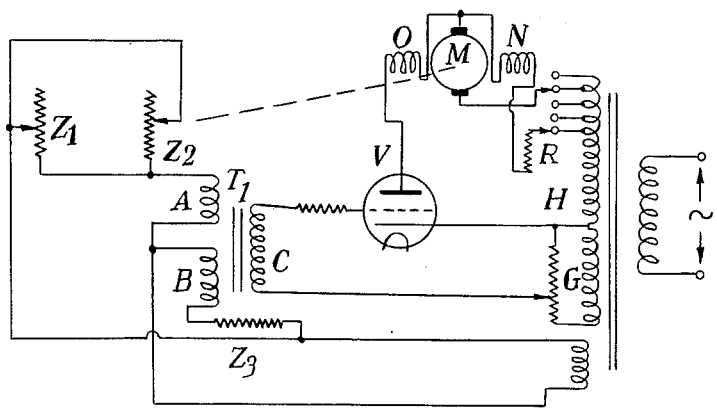

Another embodiment of the invention using a single gas-filled relay or thermionic valve is shown in Fig. 5. In this embodiment, the balancing transformer $T_1$ has three windings, A, B and C, of which A is a common primary and secondary winding, B is a biasing winding and C the grid winding for applying the control voltage to the control grid of the thermionic valve or gas-filled relay V. The primary or controlling element is the variable impedance $Z_1$, variation of which causes the current passing through the winding A to vary accordingly. The secondary or controlled impedance is $Z_2$ and may be connected either in parallel (as shown) or in series with the primary impedance as determined by the circumstances. Whichever method is adopted, variation of voltage across winding A due to variation of $Z_1$ can be compensated for or brought back to normal by a corresponding adjustment of $Z_2$ in the opposite electrical sense. With such an arrangement, the voltage drop across the winding A and hence across C would tend to become excessive since the primary (controlling) current and the secondary (controlled) current pass in the same direction through the winding A. In this case, the grid bias applied to the control grid through winding C would have to be excessively large, and furthermore, the core of the transformer $T_1$ would carry a high flux which, as already pointed out, is very undesirable. Thus, a biasing current adjusted by means of $Z_3$ is passed through the winding B in the opposite direction to the currents in the winding A, reducing the voltage drop across the transformer to a small value. Although, as mentioned above, the grid bias applied to the control grid may be adjusted by the adjustment of the amplitude and/or phase of this biasing current, it is often more convenient to carry out the final adjustment by means of the usual grid bias winding G, as shown in the diagram. With the normal, or balanced, potential applied to the control grid of the gas-filled relay or thermionic valve V, a definite anode current passes, and to prevent rotation of the motor M under these conditions, a biassing current is passed through a field winding N in such a direction as to oppose the field produced by the anode current passing through the winding O. The motor thus remains stationary, but should the anode current vary, the armature will turn in one direction or the other according to the preponderance of the opposing magnetomotive forces due to the field windings N and O. The biassing current is regulated by the impedance R, or by means of tappings on the transformer winding H.

Figure 6:
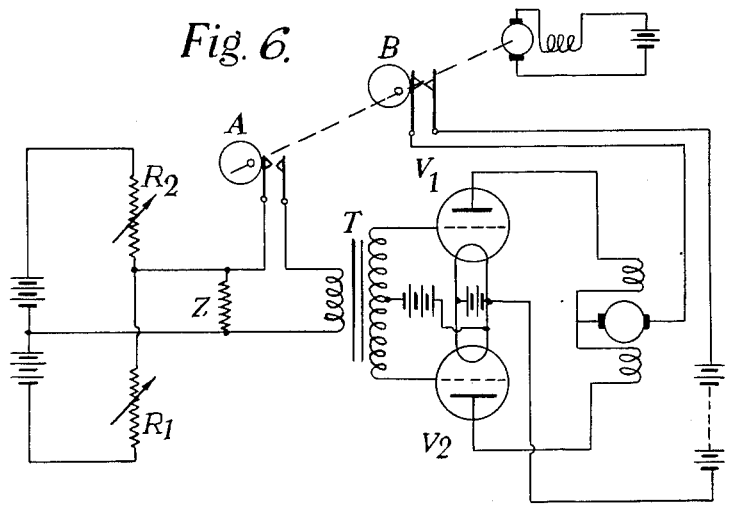

In cases where the electrical supply to the anodes of the thermionic valves or gas-filled relays is direct current and/or when direct current is supplied to the primary and secondary circuits, interrupting devices may be used. An example of this type of circuit is shown in Fig. 6, in which a balancing impedance Z is used in conjunction with a primary resistance $R_1$ fed from a D. C. supply (shown as a battery but which may be any source of supply) and a secondary or controlled resistance $R_2$ similarly supplied. The voltage appearing across the balancing impedance Z may, of course, be applied directly to the control grids of the thermionic valve or gas-filled relays $V_1$ and $V_2$, but greater sensitivity is obtainable if the voltage is amplified by means of the amplifying transformer T after interruption by the interrupter A. Control voltages of opposite polarity are thus supplied to the grids from the secondary of the transformer, and since this voltage is alternating, it is necessary to close the anode circuit for a portion only of the cycle, otherwise both valves or relays would pass increased anode current. This is accomplished by means of the interrupter B working in synchronism with the interrupter A. Thus the operation is similar to that when alternating current is used, since in this case anode current can only pass during the positive half cycle of anode voltage, corresponding to the period during which the interrupter B is closed. The interrupters may be of any type capable of operating with the desired speed, e. g. commutator and brushes, or cam-operated contacts, as shown in Fig. 6.

Figure 7:
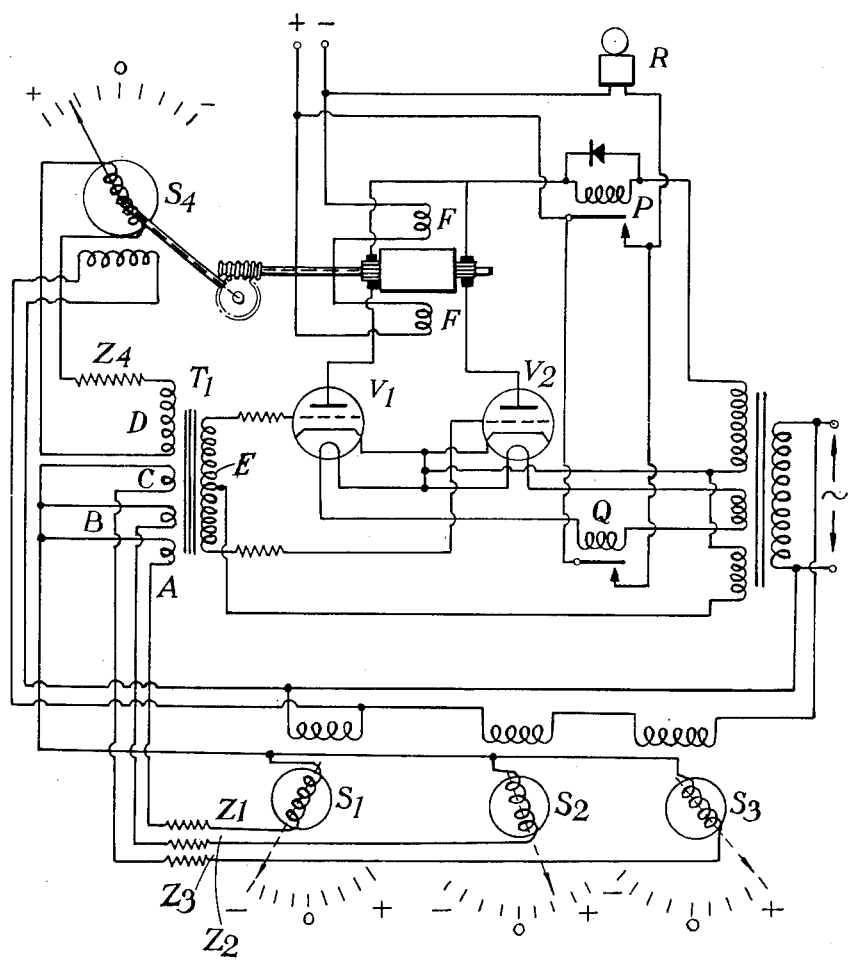

Another embodiment of the invention, as applied to a system adapted to indicate, record or otherwise transmit the compounded indications of two or more measuring or transmitting devices (or of repeating the indication of one such device) is shown in Fig. 7. The transmitting devices are shown as induction type voltage regulators at $S_1$, $S_2$ and $S_3$, but they may equally well be any device which can vary the "primary" currents in the impedances $Z_1$, $Z_2$ and $Z_3$, e. g. variable impedances or tapped transformers. The primary currents pass through the windings A, B and C of the balancing transformer $T_1$, any or all of which windings may be made common, if so expedient. The secondary current is controlled in a manner similar to the primary currents, i. e. in the example illustrated, by means of the induction regulator $S_4$, and passes through the winding D on the transformer $T_1$. The winding E of this transformer is shown connected to two thermionic valves or gas-filled relays $V_1$ and $V_2$ but, of course, any of the single valve arrangements described may be used if desired. The two-valve arrangement is shown by way of example adapted for use with a reversible electric motor having two armature or armature windings of opposite sense, with a field magnet F externally energised from a source of direct current.

The grid bias of the thermionic valves or gas-filled relays is so adjusted that a definite minimum anode current is passed under normal conditions, this current being sufficient to hold the relay P open. The relay may, as stated above, be interconnected with a non-linear impedance, and Fig. 7 shows a non-linear impedance of the rectifier type previously described with reference to Fig. 3, connected in parallel with the relay P. When thus connected, the voltage drop across the relay is prevented from reaching an excessive value.

In the event of the anode current of the two valves falling below this minimum value, due to failure of one or both of the valves, the contacts of the relay P close and the alarm R is operated. A second relay Q included in the filament or heater circuit of the valves, similarly operates the alarm, or a separate alarm, in the event of the filament or heater circuit falling below a minimum value through any cause. The relays may also be provided with contacts adapted for switching into the circuit spare thermionic valves or gas-filled relays in place of the faulty valve or relays.

The invention is not limited to the particular arrangement described above, which are illustrative embodiments and the precise arrangement adopted may be modified to suit the conditions or local circumstances. It is therefore not intended to limit the scope of the invention to the exact forms shown nor otherwise than by the terms of the appended claims.

Having thus described this invention what I claim as new therein and desire to secure by Letters Patent is:

1. A remote control device comprising means for producing a voltage varying with the condition of a primary element, means for producing a second voltage varying with the condition of a secondary element, a balancing impedance to which the said voltages are applied and compounded, a separate impedance interconnected with the balancing impedance to modify the compounded voltage, a thermionic valve having a control element, means for applying the compounded voltage to said control element, and means for varying the condition of the secondary element in accordance with the current flow through said valve in such a manner that the tendency of the secondary element is to produce a condition of equilibrium in the system determined by the condition of the primary element.

2. A remote control device comprising means for producing a voltage varying with a condition of a primary element, means for producing a second voltage varying with a condition of a secondary element, a balancing transformer to which said voltages are applied and compounded, a thermionic valve having a control element, means for applying the compounded voltage to said control element, a non-linear impedance connected with the transformer to modify the compounded voltage, and means for varying the condition of the secondary element in accordance with the current flow through said valve.

3. A remote control device comprising means for producing a voltage varying with a condition of a primary element, means for producing a second voltage varying with a condition of a secondary element, a balancing transformer to which said voltages are applied and compounded, a thermionic valve having a control element, means for applying the compounded voltage to said control element, a separate impedance connected with the balancing transformer to modify the compounded voltage, and means for varying the condition of the secondary element in accordance with the current flow through said valve.

4. A remote control device comprising means for producing a voltage varying with a condition of a primary element, means for producing a second voltage varying with a condition of a secondary element, a balancing transformer to which said voltages are applied and compounded, a thermionic valve having a control element, means for applying the compounded voltage to said control element, said balancing transformer including a winding for the passage of a biasing current, means to control the amplitude and phase of the biasing current, and means for varying the condition of the secondary element in accordance with the current flow through said valve.

5. A remote control device comprising means for producing a voltage varying with the condition of a primary element, means for producing a second voltage varying with the condition of a secondary element, a balancing transformer to which said voltages are applied and compounded, a thermionic valve having a control element, means for applying the compounded voltage to the control element, means for varying the condition of the secondary element in accordance with the current flow through the valve, a supplemental winding on said transformer, and a non-linear impedance connected to said winding to modify the compounded voltage.

6. A remote control device comprising means for producing a voltage varying with the condition of a primary element, means for producing a second voltage varying with the condition of a secondary element, a balancing transformer to which said voltages are applied and compounded, means responsive to the compounded voltage on said transformer for varying the secondary element to produce a condition of equilibrium in the system determined by the condition of the primary element, a supplemental winding on said transformer, and a non-linear impedance connected to said winding to modify the compounded voltage.

RAYMOND JOHN WEY.